R. T. SMITH, Jr.
WHEEL FOR MOTOR CARS AND OTHER VEHICLES.
APPLICATION FILED DEC. 27, 1913.
1,099,133.
Patented June 2, 1914.
2 SHEETS—SHEET 1.
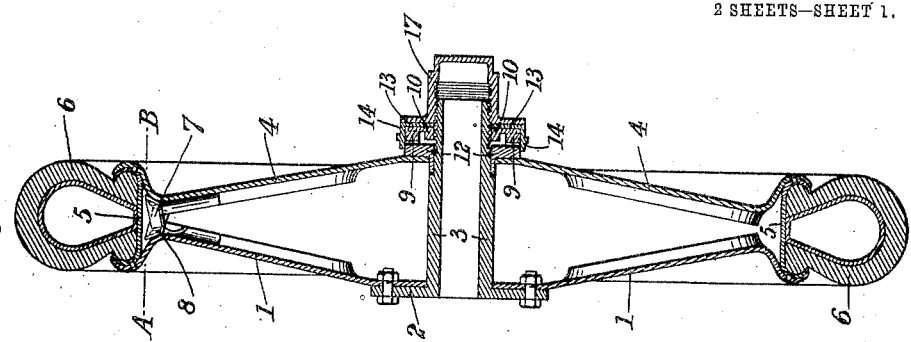
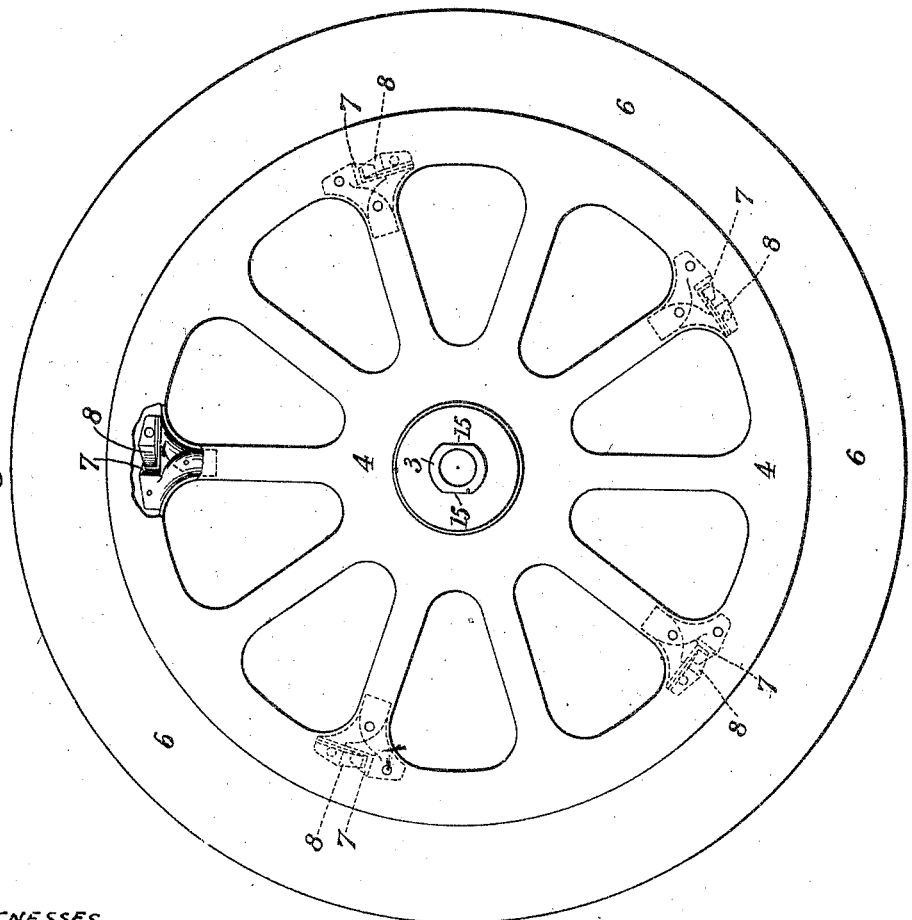
WITNESSES
L. H. Grote
A. E. Powell
INVENTOR
ROBERT THOMAS SMITH, JR.
BY Howson and Howson, Attorneys

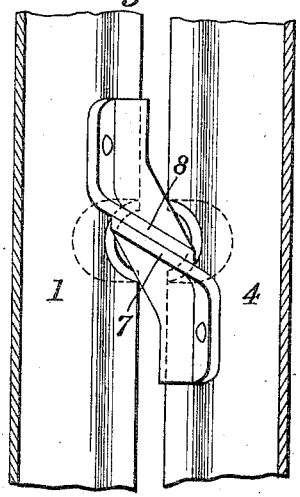
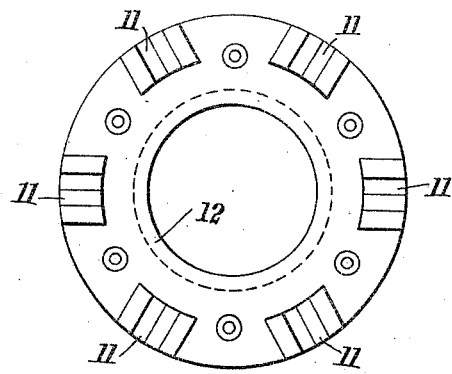
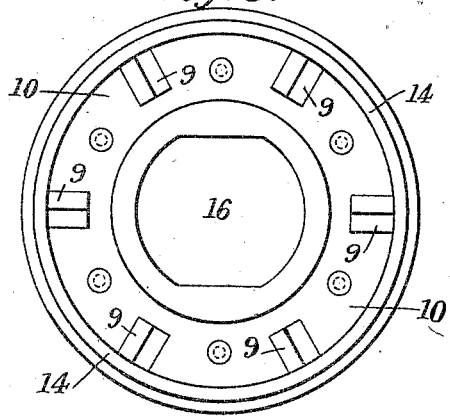
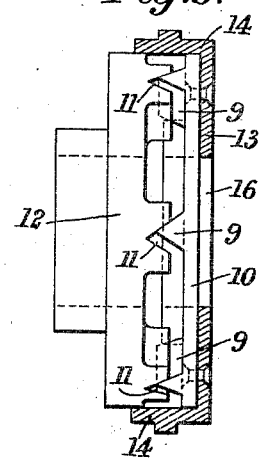

UNITED STATES PATENT OFFICE.

ROBERT THOMAS SMITH, JR., OF WARRINGTON, ENGLAND.

WHEEL FOR MOTOR-CARS AND OTHER VEHICLES.

1,099,133.      Specification of Letters Patent.      Patented June 2, 1914.

Application filed December 27, 1913. Serial No. 808,970.

*To all whom it may concern:*

Be it known that I, ROBERT THOMAS SMITH, Jr., a subject of the King of Great Britain, residing at 111 Lovely Lane, Warrington, England, have invented new and useful Improvements in Wheels for Motor-Cars and other Vehicles, of which the following is a specification.

This invention relates to vehicle wheels having detachable and replaceable pneumatic, or other elastic tires, held in grooves formed in the peripheries of two disks of steel, or other suitable metal, which disks have, preferably, but not necessarily, parts removed for the sake of lightness, and they are preferably dished for the sake of strength, the tire being carried upon a rim which, or a portion thereof, is separable from the main body of the wheel so that the tire and rim, or the tire and a portion of the said rim can together be separated from the main body of the wheel upon the removal of the outer disk. In wheels of this kind the inner disk is secured to the hub of the wheel and the outer disk is removably secured to the said hub by a central nut, and in order to prevent lateral and rotary movements of the outer disk with respect to the inner disk when the parts are assembled various means have been proposed to be employed, such for example, as bolts, or the equivalent, arranged at or toward the peripheries of the disks, or inwardly projecting pieces arranged at, or toward, the peripheries of the respective disks and having inclined parts adapted to interlock when the disks are in position.

In wheels of this kind it is desirable that the outer disk should be capable of being easily and quickly removed and replaced and this invention has for its object to provide wheels having the aforesaid inwardly projecting pieces with means, which by simply screwing up the usual central nut on the hub of the wheel, causes the inclined parts of the said pieces to more firmly interlock and the outer disk to be more effectually prevented from rotation.

The aforesaid inwardly projecting pieces prevent, through their inclined parts, outward lateral movement of the disks with respect to each other and also prevent rotary movement in one direction of the outer disk with respect to the inner disk. In order to prevent rotary movement in the other direction and to cause the inwardly projecting pieces to more firmly interlock, as aforesaid, I provide, according to this invention a number of grooves or recesses, preferably of V-shape, on the face of the outer disk and a plate, slidable but not rotatable, on the hub of the wheel, having correspondingly shaped projections which are adapted to enter the said grooves, or recesses, and to engage with one side thereof, so that upon the said plate being forced along the hub of the wheel, which is effected by screwing up the central nut, the said projections act to slightly rotate the said outer disk. The inwardly projecting pieces on the outer disk having, however, been brought into engagement with the inwardly projecting pieces on the inner disk when the disks were assembled, the aforesaid slight rotary movement of the outer disk can now only be effected by the said outer disk simultaneously moving toward the inner disk, thus causing the inclined parts of the pieces on the outer disk to slide on the inclined parts of the pieces on the inner disk and thereby causing the said inclined parts to wedge and more firmly interlock than hitherto. It will also be seen that the outer disk is prevented from rotating in one direction by the engagement of the said inclined parts and that it is prevented from rotating in the other direction by the projections on the non-rotatable sliding plate, and, moreover, that as the said outer disk is prevented from rotating in both directions, outward lateral movement of either disk is, owing to the aforesaid inclined parts, consequently impossible.

I will now particularly describe my invention with reference to the accompanying drawings in which—

Figure 1 shows in side elevation, with a part broken away and with the central securing nut removed, and Fig. 2 in transverse section a wheel of the kind referred to provided with means in accordance with this invention. Fig. 3 is a transverse section, taken on the line A. B. Fig. 2; Fig. 4 is a face view of a piece, detached from the outer disk, having grooves, or recesses therein; Fig. 5 is a face view of a piece having projections thereon and Fig. 6 shows in elevation, partly in section, the relative positions of the aforesaid pieces when assembled. The Figs. 3, 4, 5 and 6 are drawn to a larger scale than Figs. 1 and 2.

The wheel shown in Figs. 1 and 2 comprises an inner disk 1 secured to a flange 2 of a hub 3 and an outer disk 4 having limited sliding movement on the said hub. The peripheries of the disks 1 and 4 are grooved as shown into each of which grooves is secured, preferably by rivets, a portion of a divided rim 5 supporting a pneumatic tire 6 so that upon the removal of the outer disk 4 and the portion of the rim secured thereto the said tire can be readily detached and replaced by another.

Secured to the outer disk 4 are a number of inwardly projecting inclined pieces 7 which are adapted to engage with and overlap correspondingly arranged inclined pieces 8 secured to the inner disk 1. The inclined pieces 7 and 8 prevent rotary movement in a clockwise direction as viewed in Fig. 1 of the outer disk 4 with respect to the inner disk 1 and also prevent outward lateral movement of the peripheries of the said disks as shown more clearly in Fig. 3. Rotary movement, in a counter-clockwise direction, as viewed in Fig. 1, of the outer disk 4 with respect to the inner disk 1, is prevented by V-shaped projections 9 (see more particularly Fig. 5) formed on a plate 10 which engage with correspondingly shaped grooves, or recesses, 11 provided on the face of the outer disk 4. The grooves, or recesses, 11 (see more particularly Figs. 4 and 6) are formed in a piece 12 adapted to be secured to the disk 4 by bolts, or rivets, and the plate 10 upon which the projections 9 are formed is shown (see more particularly Fig. 6) secured, by rivets, to another plate 13 having a flange 14 which fits over the piece 12 and prevents the entry of grit between the parts when assembled. The plates 10 and 13 are slidable on the end portion of the hub 3 but are prevented from rotating thereon, preferably, by flattening the said end portion as shown at 15 in Fig. 1 and correspondingly shaping the hole 16 in the said plates as shown in Fig. 5. Assuming the tire 6 to be in position on the fixed portion of the rim 5 the outer disk 4 with the remaining portion of the said rim thereon, is placed on the end of the hub 3, pressed toward the inner disk 1, and turned on the said hub until the inclined projecting pieces 7 thereon engage with the inclined projecting pieces 8 on the inner disk 1. The plate 10 and the plate 13 secured thereto are then placed on the end of the hub 3, so that the projections 9 engage with the grooves, or recesses 11 as shown in Fig. 6. A nut 17 (shown in Fig. 2 as a flanged screw-threaded cap) screwed on the end of the hub 3 acts, through the aforesaid projections 9 and grooves, or recesses, 11, to force the outer disk 4 toward the inner disk 1 and at the same time to slightly turn the said outer disk on the hub 3 so that the inclined pieces 7 and 8 are maintained in engagement. Any suitable means may, if desired, be provided for locking the nut, or screwed-cap 17 in position.

By the employment of the hereinbefore described means rotation, or creeping, of one disk with respect to the other, and lateral movement, or spreading out, of the said disks at their peripheries is effectually prevented and the tire is more securely held by the said disks.

It is to be understood that the invention is not limited to the precise details of construction hereinbefore described and illustrated in the accompanying drawings as it is obvious that changes may be made without departing from the nature of the said invention, nor is the invention restricted to the employment of any particular tire, or rim, for instance, instead of making the rim in two parts, one part secured to the outer disk and the other part secured to the inner disk, it may be made in one piece and separable from both disks so that the tire and rim can together be removed from the main body of the wheel and be replaced by another rim having, for instance, a fully inflated tire thereon.

What I claim is:—

1. In a vehicle wheel of the character described, a hub, a fixed disk extending between the hub and the wheel periphery and rotating with the hub, a coöperating disk sleeved on the hub and opposed to said fixed disk, inwardly projecting inclined wedge pieces at the outer portion of each of said disks adapted to engage and prevent relative rotation of said free disk in one direction with relation to said fixed disk in assembled position, means carried by the hub and interlocking with said free disk at its hub portion to prevent its rotation in the opposite direction with relation to said fixed disk and screw means on the hub for pressing said disks toward each other to bring together the said inclined wedge pieces on the outer portions of said disks whereby said disks are slightly rotated with relation to each other by reason of the engagement of the said wedge pieces and the disks locked against relative rotation in either direction, substantially as described.

2. In a vehicle wheel, a wheel hub, a disk forming a portion of the wheel web and freely mounted on said hub, a wedging member slidable but not rotatable on said hub, a coöperating wedge plate rigid with said disk at its hub portion, means for pressing said wedging members together to lock the disk against rotation in one direction, a coöperating web disk rigid with said wheel hub, and wedge pieces at the outer portions of said web disks engaging in the assembled position of the disks to prevent their relative rotation in the opposite direction, substantially as described.

3. In a vehicle wheel, a hub, a pair of web-forming cupped disks mounted thereon, with their concave faces opposed, one of said disks being rigidly secured to the hub and the other disk being freely mounted thereon, coöperating wedge members on the outer portions of said disks adapted to engage and prevent the rotation of said free disk in one direction with relation to said fixed disk when in assembled position and wedge means on the said hub engaging the hub portion of said free disk to prevent its rotation in the opposite direction, substantially as described.

In testimony whereof I have signed my name to this specification in the presence of two subscribing witnesses.

ROBERT THOMAS SMITH, JUNIOR.

Witnesses:
J. McCORMICK,
C. MARSH.